US006966387B2

(12) United States Patent
Marriott, Jr. et al.

(10) Patent No.: US 6,966,387 B2
(45) Date of Patent: Nov. 22, 2005

(54) UNIVERSAL OPTICAL ADAPTER FOR A THREE DIMENSIONAL EARTHGRADING SYSTEM

(75) Inventors: Emden E. Marriott, Jr., Livermore, CA (US); John W. Fletcher, Livermore, CA (US)

(73) Assignee: AGTEK Development Company, Inc., Livermore, CA (US)

( * ) Notice: Subject to any disclaimer, the term of this patent is extended or adjusted under 35 U.S.C. 154(b) by 0 days.

(21) Appl. No.: 10/133,308

(22) Filed: Apr. 25, 2002

(65) Prior Publication Data

US 2003/0006048 A1 Jan. 9, 2003

Related U.S. Application Data

(60) Provisional application No. 60/303,348, filed on Jul. 5, 2001.

(51) Int. Cl.[7] .......... E02F 3/76; G01C 3/20; G01C 15/06; G01B 11/26
(52) U.S. Cl. .......... 172/4.5; 701/50
(58) Field of Search .......... 172/2, 4.5, 4, 3, 172/811, 812, 810; 701/50

(56) References Cited

U.S. PATENT DOCUMENTS

| | | | | |
|---|---|---|---|---|
| 3,494,426 | A | 2/1970 | Studebaker | 172/4.5 |
| 4,820,041 | A | 4/1989 | Davidson et al. | 356/1 |
| 6,498,338 | B2 * | 12/2002 | Oosterling et al. | 250/221 |

OTHER PUBLICATIONS

*AGTEK Blade Control System*, AGTEK Development Company, Inc, date unknown.
*AGTEK Motor Grader Control System Four*, AGTEK Advanced Grade Technology, 7010-0106 10M Nov. 1989.
*AGTEK Non-Contacting Grade Control For Pavers*, AGTEK Advanced Grade Technology, 7010-0100 Mar. 1989 5M.
*AGTEK construction lasers for superior machine control and grade checking.*, AGTEK Advanced Grade Technology, date unknown.
*Sitework LT / 3D Engineering from CAD Files / Buildable Models For Civil Construction*, AGTEK Construction Computer Products, date unknown.
*Build the Job from Your Takeoff? / Graphic Grade/Total Station / On-Site 3D Control for Contractors*, AGTEK Construction Computer Products, date unknown.
*Turbocharge your finish grade production.*, AGTEK Advanced Grade Technology, date unknown.
*Old Dog, New Tricks.*, AGTEK Advanced Grade Technology, date unknown.

* cited by examiner

*Primary Examiner*—Christopher J. Novosad
(74) *Attorney, Agent, or Firm*—Beyer Weaver & Thomas LLP

(57) ABSTRACT

A universal optical adapter assembly for use with a planar automatic grading system for an earth-moving vehicle having a grading implement that defines a graded surface. The automatic grading system includes an energy beam receiver mounted on the earth-moving vehicle and operable for detecting the height at which a datum energy beam strikes the receiver along a detection portion thereof. A control device is operably coupled to the energy beam receiver and the grading implement to control the elevation of the grading implement in response to the position at which the datum energy beam strikes the detection portion of energy beam receiver. The optical interface adapter assembly includes an optical interface apparatus having an energy source emitting one or more implement controlling energy beams strategically onto selected positions of the detection portion the energy beam receiver to control the elevation of the grading implement. Mounting structure is included which is configured to mount the interface apparatus substantially adjacent to the detection portion of the energy beam receiver.

69 Claims, 9 Drawing Sheets

UNIVERSAL OPTICAL ADAPTER FOR A THREE DIMENSIONAL EARTHGRADING SYSTEM

RELATED APPLICATION DATA

The present application claims priority under 35 U.S.C. §119 to U.S. Provisional Application Ser. No. 60/303,348 naming Marriott et al. as inventors, and filed Jul. 5, 2001, the entirety of which is incorporated herein by reference for all purposes.

FIELD OF THE INVENTION

The present invention relates generally to surveying apparatus and earth-grading apparatus, and more specifically to three dimensional grading guidance systems and to the laser receivers employed in automatic laser grade control systems.

BACKGROUND OF THE INVENTION

According to conventional practice, the process of transforming a tract of land into a graded surface involves several tasks, typically beginning with the task of surveying the land in order to create a contour map or other graphical representation of the pre-existing state of the land. Surveying involves the delineation of the form, extent, and position of the tract of land based on linear and angular measurements of the land. Conventional surveying is at least a two person job, with one person operating a measuring instrument from a generally stationary position and the other person transporting and positioning a grade rod or other reference to be sighted by the measuring instrument.

The measuring instrument, such as a transit, theodolite, distance meter, or total station, is positioned at a known distance and angle from a reference, or bench position. The grade rod is sequentially positioned at one or more locations, and at each such location, the distance and angle of the grade rod with respect to the position of the measuring instrument is determined and recorded. Distances may be measured manually with a steel tape or chain, or may be measured optically by the measuring instrument utilizing various means such as a retroreflector on the grade rod. Angles are typically measured in both horizontal and vertical planes, with an azimuth angle defined as the horizontal angle measured clockwise from north, and a zenith angle defined as the vertical angle measured downward from the vertical.

From the distance and angle information obtained in the survey, and through application of the principles of geometry and trigonometry, the surface of the tract of land can be characterized and presented in graphical form. The position or location of any point on the tract of land can be represented in a variety of three-dimensional coordinate systems such as X, Y, Z, or R, θ, Z, where X, Y, Z denotes a Cartesian coordinate system in which the X-Y plane is horizontal and the Z-axis is vertical, and where R, θ, Z denotes a cylindrical coordinate system in which the R-θ plane is horizontal and the Z axis is vertical. The X, Y or R, θ coordinates are measured in a horizontal plane with respect to some bench mark position, while the Z coordinate is the elevation measured with respect to some horizontal reference plane, such as mean sea level.

After the tract of land has been surveyed, a site plan can be drawn up to define what the contours and elevations of the land should be after grading. In accordance with conventional practices, the site is then marked with stakes in order to guide the operators of earth-moving equipment while they grade the land into conformity with the site plan. The process of marking involves first defining on the site plan the coordinates of various key locations to be marked, and then placing stakes on the land at those locations. The task of marking the land can utilize the same surveying apparatus described above. The grade rod is roughly positioned near a location to be marked, and its position is determined by the measuring instrument. If the grade rod is not exactly positioned at the location to be marked, the position is noted and the grade rod is repositioned and remeasured until the measuring instrument verifies that the grade rod is positioned at the location to be marked. A stake or other marker is then driven into the ground at that point. Like surveying, the conventional process of marking a tract of land is also a task that requires at least two trained people.

In order to designate the desired elevation at the marked locations, the stakes are typically marked with indications of the depth of fill or cut needed to create the desired graded surface at those locations. Such fill or cut information can be determined according to the elevational differences between the existing ground site and the site plan.

After the tract of land has been marked, earth-moving equipment can be used for grading the site. The operators of the earth-moving equipment are guided by the marker stakes in determining where to cut and where to fill. Care must be exercised to avoid damaging the stakes during the grading operation. The site may need to be re-surveyed during or after completion of the grading to verify the accuracy of the graded surface. With the necessary tasks of surveying, marking, and resurveying, the convention practice of transforming a tract of land into a graded surface is unavoidably labor intensive, even apart from the actual grading operations.

To automate grading of the surveyed land, automatic control systems for earth-moving equipment have been developed to control the elevation of the grading implement. As best viewed in FIGS. 1 and 2, these first generation automatic laser grade control systems 10 typically include a laser transmitter 11, a laser receiver 12, a control box 13 and a hydraulic valve 14. The valve 14 is then operably coupled to the hydraulic rams 15 to automatically control the raising or lowering of the blade 16 of the earth-grading apparatus 17.

Generally, the laser transmitter 11 includes a rotating laser beacon 18 which sweeps out a plane 19 of pulses of light 20 parallel to the desired graded surface. In ordinary operation, the pulses of light 20 from the rotating beacon 18 strike light sensitive cells 21 in the receiver 12 mounted on the machine blade 16, typically through rod 22 or mast. As better illustrated in FIG. 3, the receiver cells 21 are arranged in a vertical array with the vertical displacement from the array's center corresponding to the amount of grade correction required, resulting in coarse, fine or on-grade correction signals. Correction signals from the receiver 12 are processed through the control box 13 to an electrically actuated hydraulic valve 14 which drives the hydraulic rams 15 to raise or lower the blade.

While this automatic laser grade control system is capable of precise automatic control of the blade elevation through control of the hydraulic valve, this control is essentially one dimensional. That is, these systems, provide only planar control of the blade that is otherwise independent of the blade's location on the site, and generally can be satisfactorily applied only to those portions of the site plan which are large planar surfaces. Typical of these automatic laser control systems is the System IV™ with laser receiver manufactured by Topcon Laser Systems, Inc., of Pleasanton Calif., the concept of which was disclosed in part in U.S. Pat. No. 3,494,426, herein incorporated by reference in its entirety.

More recently, three dimensional grading guidance systems 30 and three dimensional grade control systems have been introduced to overcome the limitation of planar dimensional systems.

As shown in FIG. 4, a three dimensional grading guidance system 30 generally includes an optical or GPS real time three dimensional positioning system 31 with the measure point in the machine's blade 16. A three dimensional computer model 32 of the grading plan is also required which is coupled to a processing and display device 33 to calculate the difference in the elevation measured by the positioning system 31 from that of the model at the same horizontal coordinates. Control of the blade is performed manually based upon the grading guidance information provided to the machine operator. An example of a GPS real time three dimensional grading guidance system is the SiteVision™ system manufactured by Trimble Navigation Limited of Sunnyvale, Calif.

Automatic three dimensional grade control systems have also been developed which are capable of precise automatic control of the blade elevation through control of the hydraulic valve. An early example of an automatic three dimensional grade control system is disclosed in part in U.S. Pat. No. 4,820,041. Current commercial examples of these automatic three dimensional grade control systems are the 3DMC system manufactured by Topcon Laser Systems, Inc. of Pleasanton, Calif., and the Bladepro3D system manufactured by Trimble Navigation Limited of Sunnyvale, Calif.

For many precise grading applications, automatic three dimensional grade control systems are superior to three dimensional grade guidance systems, but they are inherently more costly because they required many additional control components. The additional control components are already present in existing conventional automatic laser grading systems. Accordingly, it would be desirable to adapt an existing conventional laser grading system to a three dimensional data base and a three dimensional positioning system such as a robotic total station or real time kinematics GPS system for a cost effective solution to automatically control the blade of the earth-moving apparatus.

SUMMARY OF THE INVENTION

In accordance with the present invention, a universal optical adapter assembly is provided for use with a planar automatic grading system for an earth-moving vehicle having a grading implement that defines a graded surface. The automatic grading system includes an energy beam receiver mounted on the earth-moving vehicle and operable for detecting the height at which a datum energy beam strikes the receiver along a detection portion thereof. A control device is operably coupled to the energy beam receiver and the grading implement to control the elevation of the grading implement in response to the position at which the datum energy beam strikes the detection portion of energy beam receiver. The optical interface adapter assembly includes an optical interface apparatus having an energy source emitting one or more implement controlling energy beams strategically onto selected positions of the detection portion the energy beam receiver to control the elevation of the grading implement. Mounting structure is included which is configured to mount the interface apparatus substantially adjacent to the detection portion of the energy beam receiver.

In one specific embodiment, the energy source includes a plurality of pulsed light emitters aligned in an array longitudinally along the optical interface apparatus to strategically pulse the one or more controlling energy beams onto selected longitudinal positions of the detection portion for detection thereof. The optical interface apparatus is further adapted to adjust the pulse rate of the one or more controlling energy beams to simulate a strobe of a rotating laser beacon.

The array includes one or more central pulsed light emitters corresponding to an "on-grade" correction portion of the receiver detection portion, one or more upper pulsed light emitters positioned vertically above the central pulsed light emitters which correspond to a "raise" implement correction portion of the receiver detection portion, and one or more lower pulsed light emitters positioned vertically below the central pulsed light emitters which correspond to a "lower" implement correction portion of the receiver detection portion. More particularly, the upper pulsed light emitters of the optical interface apparatus include one or more "fine grade" upper emitters positioned vertically above the central pulsed light emitters, and one or more "coarse grade" upper emitters positioned further vertically above the "fine grade" upper emitters. The "fine grade" upper emitters correspond to a "fine raise" implement correction portion of the receiver detection portion, while the "coarse grade" upper emitters correspond to a "coarse raise" implement correction portion of the receiver detection portion. In a similar manner, the lower pulsed light emitters include one or more "fine grade" lower emitters positioned vertically below the central pulsed light emitters, and one or more "coarse grade" lower emitters positioned further vertically below the "fine grade" lower emitters. The "fine grade" lower emitters correspond to a "fine lower" implement correction portion of the receiver detection portion, while the "coarse grade" lower emitters correspond to a "coarse lower" implement correction portion of the receiver detection portion.

In another aspect of the present invention, a control system for an earth-moving vehicle is provided for use in grading a plot of land to a desired contour, wherein the earth-moving vehicle includes a grading implement that defines the graded surface. The control system includes an energy beam receiver mounted on an earth-moving vehicle and operable for detecting the height at which an energy beam strikes the receiver along a detection portion thereof, wherein the energy beam receiver is coupled to the grading implement for responsive movement therewith. An optical interface device is further provided which is carried by the earth moving vehicle, and includes an energy source emitting one or more energy beams onto the detection portion for detection thereof. An interface control device is coupled to the energy source, and is adapted to control the impingement of the one or more energy beams strategically onto selected positions of the receiver detection portion to control the elevation of the grading implement.

In one specific implementation, the control system includes a positioning system adapted to determine the position of the earth-moving vehicle, and the elevation of the grading implement, relative to that of the reference station. A grading data base is adapted to define the desired elevation of the grading implement as a function of the position of the earth-moving vehicle, and a processing device is included operably coupled to the data base and the positioning system to determine an elevation error of the grading implement according to the difference between the measured and desired elevations thereof. The interface control device is responsive to the elevation error to automatically adjust the operation of the one or more energy beams and control the elevation of the grading implement to reduce the elevation error.

In another specific embodiment, the positioning system includes a reference station adapted to be positioned at a known location, and a portable station carried by the earth moving vehicle, the reference station and the portable station cooperate to determine the measured position and measured elevation data of the earth moving vehicle and grading implement, respectively. The reference station includes a radio transmitter configured to broadcast a reference signal containing the measured position and measured elevation data of the earth moving vehicle and grading implement, respectively, and the portable station includes a reference signal receiver operable for receiving the reference signal. The processing device is operably coupled to the data base and the reference signal receiver to determine the elevation error of the grading implement.

In yet another configuration, the positioning system includes a robotic total station having a reflector device carried by the earthmoving vehicle, and a laser beam transmitter at the reference station that projects a laser beam which strikes and tracks the reflector device to measure the position of the earthmoving vehicle and the elevation of the grading implement.

In still another aspect of the present invention, a control system includes an energy beam receiver mounted on the earth-moving vehicle and operable for detecting the height at which an energy beam strikes the receiver along a detection portion thereof. The energy beam receiver is coupled to the grading implement of the earth-moving vehicle for responsive movement therewith. An optical interface device is adapted to mount to the energy beam receiver such that one or more energy beams emitted from the interface device strategically strikes selected positions of the detection portion for detection thereof. A grading implement control device is included coupled to the energy beam receiver and the grading implement, and responsive to the selected position at which the one or more energy beams strike the detection portion of energy beam receiver to control the elevation of the grading implement.

In one specific embodiment, the grading implement control device includes a hydraulic valve device operably coupled to the grading implement for automatic elevation movement thereof.

In another configuration, the detection portion of the energy beam receiver includes a linearly extending array of energy sensitive receiving cells including a datum cell or cells. The optical interface device is then properly positioned relative the receiving cells of the energy beam receiver for height measurement when the datum cell or cells detects a datum energy beam of the one or more energy beams of the energy source. The energy beam receiver is further configured to indicate whether receiving cells above or below the datum cell or cells are detecting the one or more energy beams of the energy source. The detection of the one or more energy beams by a receiving cell or cells positioned above the datum cell or cells indicates that the energy beam receiver is positioned too low, and the detection of the one or more energy beams by a receiving cell or cells positioned below the datum cell indicates that the energy beam receiver is positioned too high.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawing, in which:

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details.

Figure 2:
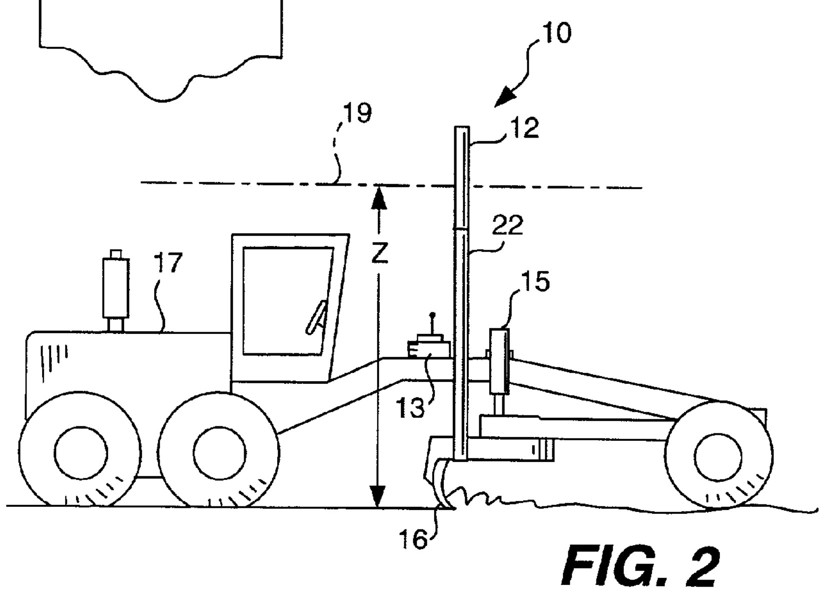
FIG. 2 is a conventional earth moving vehicle with a laser receiver component of the laser grading system mounted to the grading implement.
Figure 5:
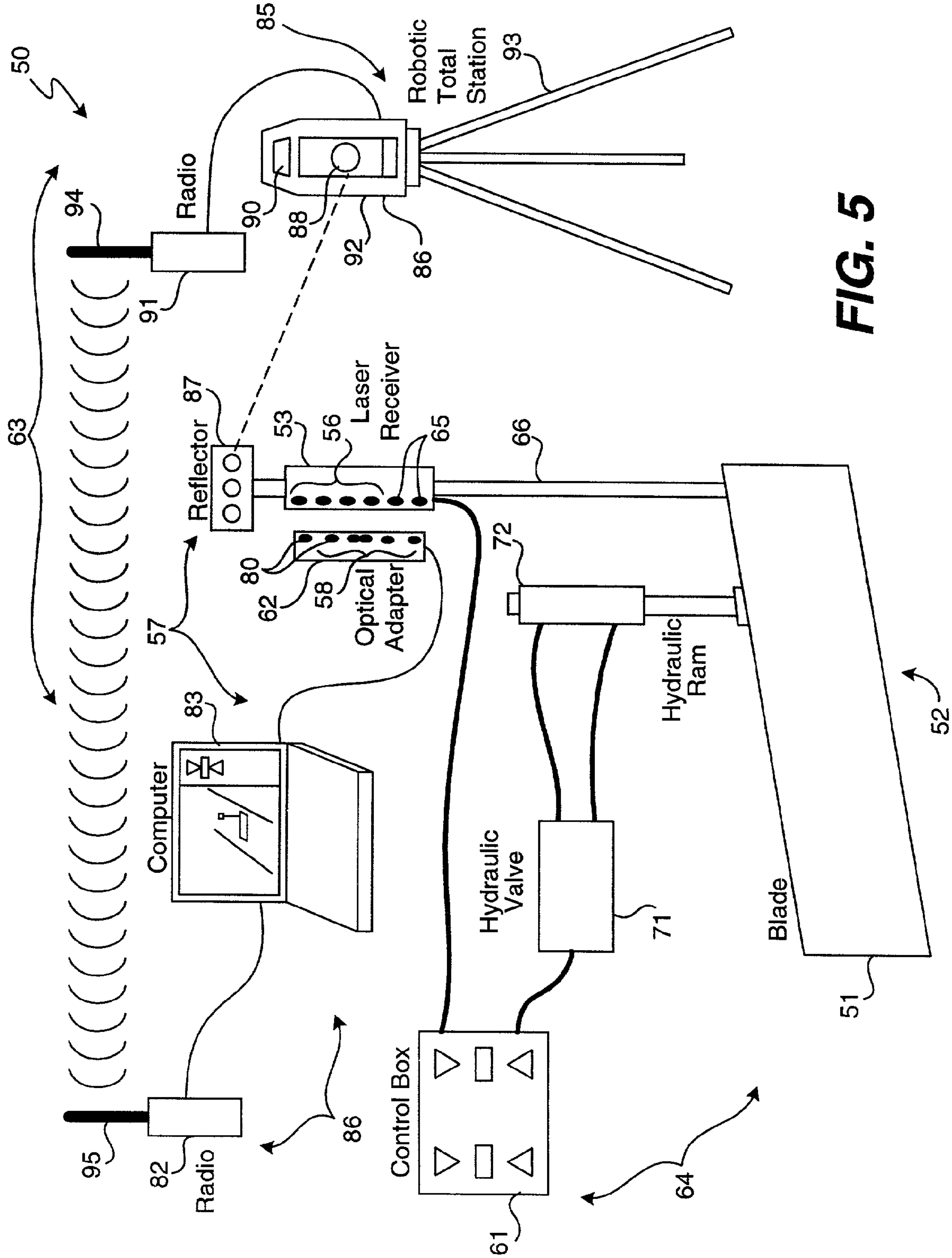
FIG. 5 is a schematic diagram of an automatic three-dimensional control system constructed from a conventional automatic laser control system by means of an optical adapter assembly in accordance with a specific embodiment of the present invention
Figure 6:
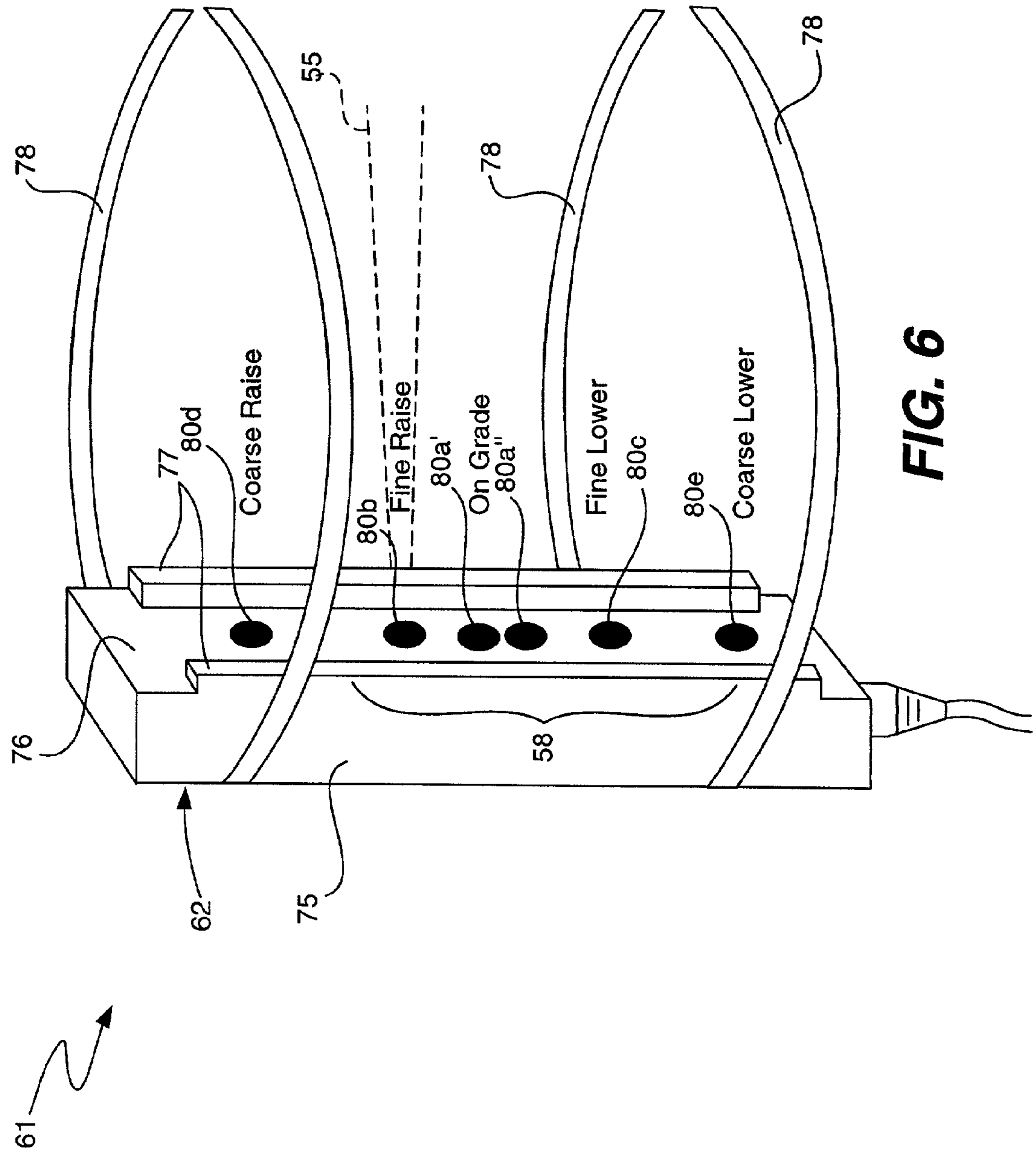
FIG. 6 is a top perspective view an optical interface apparatus of the adapter assembly of FIG. 5
Figure 7:
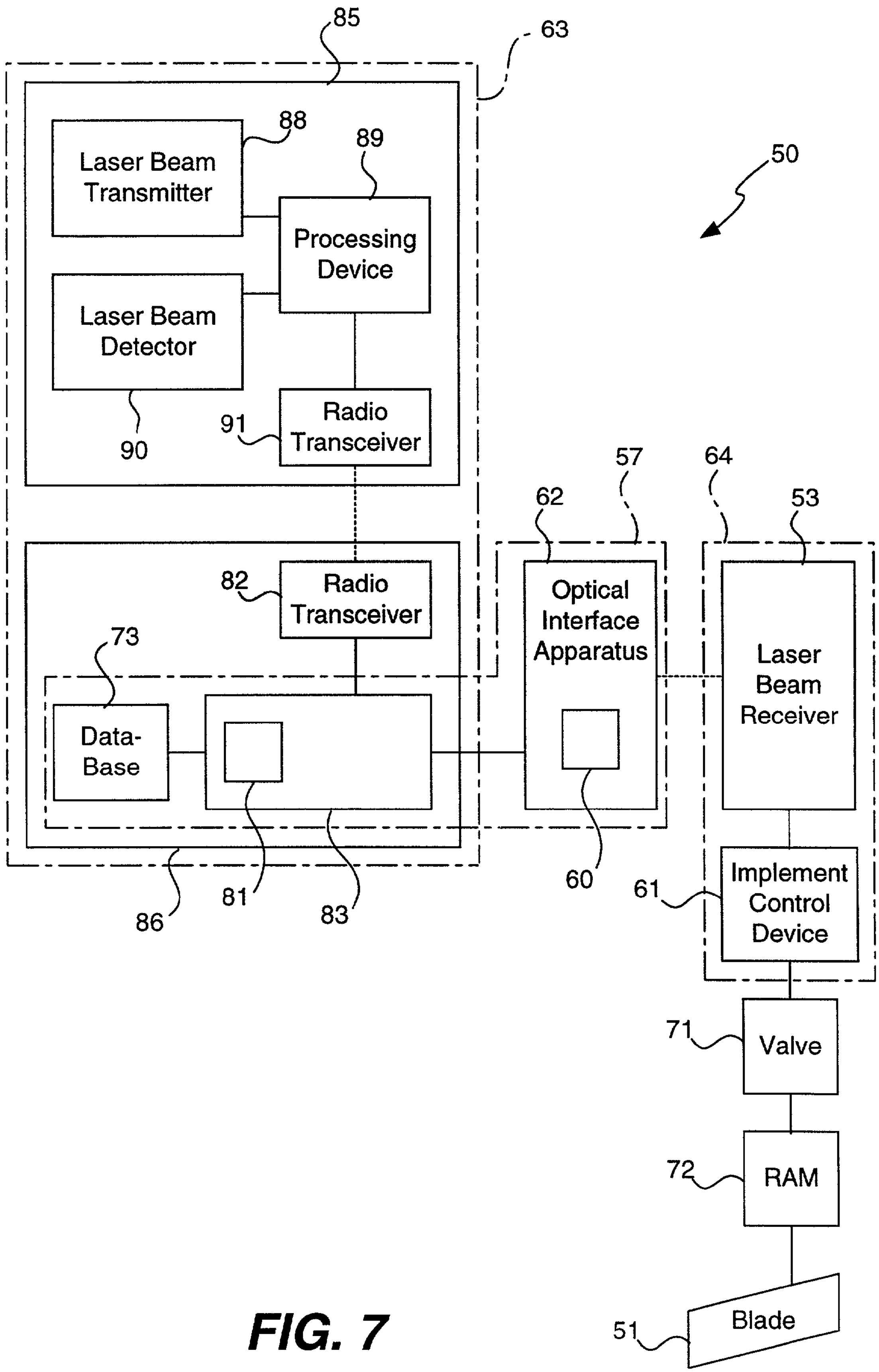
FIG. 7 is a block diagram of the present invention control system of FIG. 5.

Referring now to FIGS. 5–7, a control system, generally designated 50, is provided for a grading implement 51 of an earth-moving vehicle 52 (e.g., vehicle 17 in FIG. 2) for use in the three-dimensional grading of a plot of land to a desired contour. The control system 50 includes an energy beam receiver 53 mounted on the earth-moving vehicle 52, and operable for detecting the height at which an energy beam 55 strikes the beam receiver 53 along a detection portion 56 thereof, wherein the energy beam receiver 53 is coupled to the grading implement 51 for responsive movement therewith. A universal optical adapter assembly, generally designated 57, is carried by the earth moving vehicle 52, and includes an energy source 58 emitting one or more energy beams onto the detection portion 56 for detection thereof. An interface control device 60 is coupled to the energy source 58, and is adapted to control the impingement of the one or more energy beams 55 strategically onto selected positions of the receiver detection portion to control the elevation of the grading implement 51.

Figure 1:
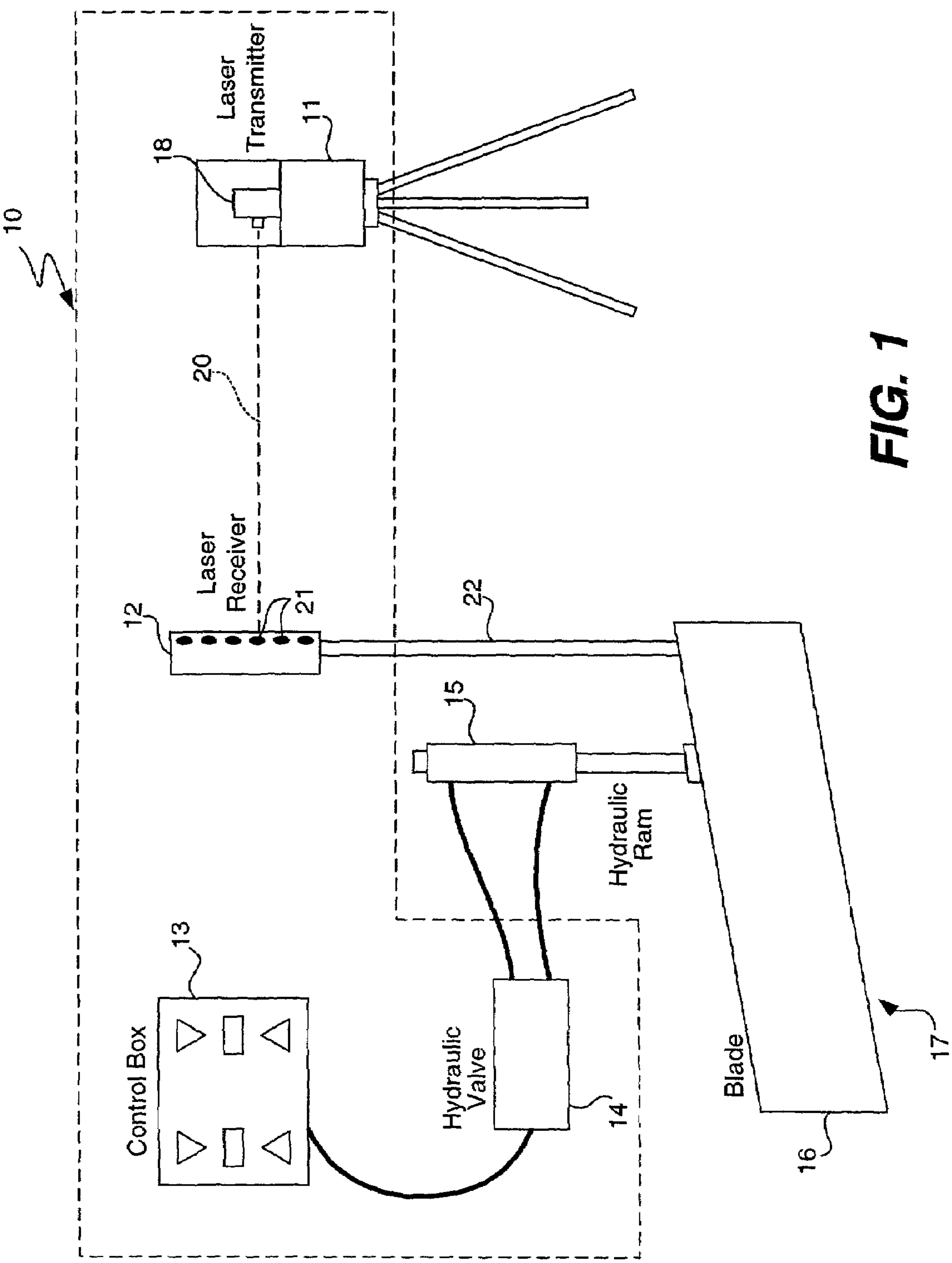
FIG. 1 is a schematic diagram of a conventional planar automatic laser grading system.
Figure 3:
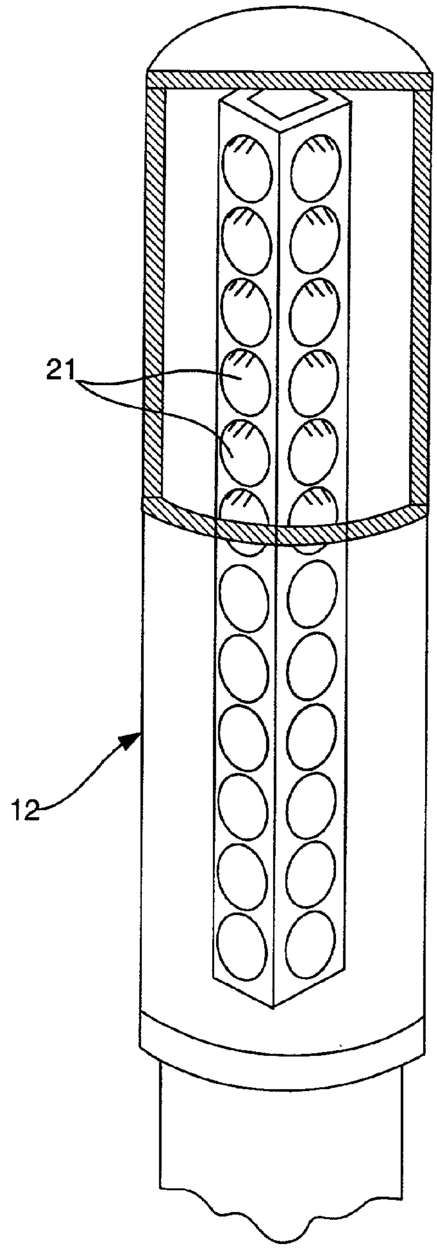
FIG. 3 is a top perspective view, partially broken-away, of a laser receiver component of the planar automatic laser grading system of FIG. 1.

In one specific implementation, the energy beam receiver 53 may be provided by a receiver component from the planar automatic laser grade control systems 10 already in wide application in the field. As mentioned above and as shown in FIG. 1, these automatic laser grading systems also typically include a rotating laser beacon component 18 that sweeps out a plane of pulses of light parallel to the desired graded surface as a reference datum plane. In ordinary operation, the pulses of light from the rotating beacon strike the energy beam receiver mounted on the machine blade 16 of the earth moving vehicle. Thus, depending upon the vertical location that the pulses of light strike the receiver, "raise", "lower" or "on-grade" correction signals are generated. Responsive to these signals, the control box 13 electrically actuates the hydraulic valve 14 which then drives the hydraulic rams 15 to raise or lower the blade 16.

In accordance with the present invention, however, the operation of an implement control device 61 (i.e., the control box 13 in FIG. 1) is controlled by the universal optical adapter assembly 57 rather than the single elevation rotating laser beacon of the reference station (referring back to FIG. 5). By placing an optical interface apparatus 62 of the universal optical adapter assembly 57 in close proximity to the energy beam receiver 53, the elevational operation of the grading implement 51 can be precisely controlled. Briefly, the optical interface apparatus 62 includes an energy source 58 configured to emit one or more implement controlling energy beams 55 strategically onto selected positions of the detection portion 56 the energy beam receiver 53 to control the elevation of the grading implement 51.

Accordingly, an optical adapter is provided which in effect seizes control of the energy beam receiver from its rotating laser beacon of the widely applied planar automatic grading systems to control the elevation operation of the grading implement. As will be apparent, by adjusting the pulse frequency to that of the particular the energy beam receiver, this universal optical adapter can be retrofit to any make and model of the automatic grading systems. Moreover, by tracking the horizontal position of the earth moving vehicle 52 (E.g., via a three-dimensional grading guidance system), and controlling the elevation of the grading implement based upon the measured horizontal position, these conventional implement control devices for the relatively one-dimensional grading of the automatic grading systems can be applied for three dimensional grading. That is, the relatively inexpensive and widely applied automatic laser grade control systems, many of which are already mounted to the earth moving vehicles, can be retrofit to and interfaced with a three dimensional grading guidance system, through the application of the optical adapter assembly of the present invention.

Figure 4:
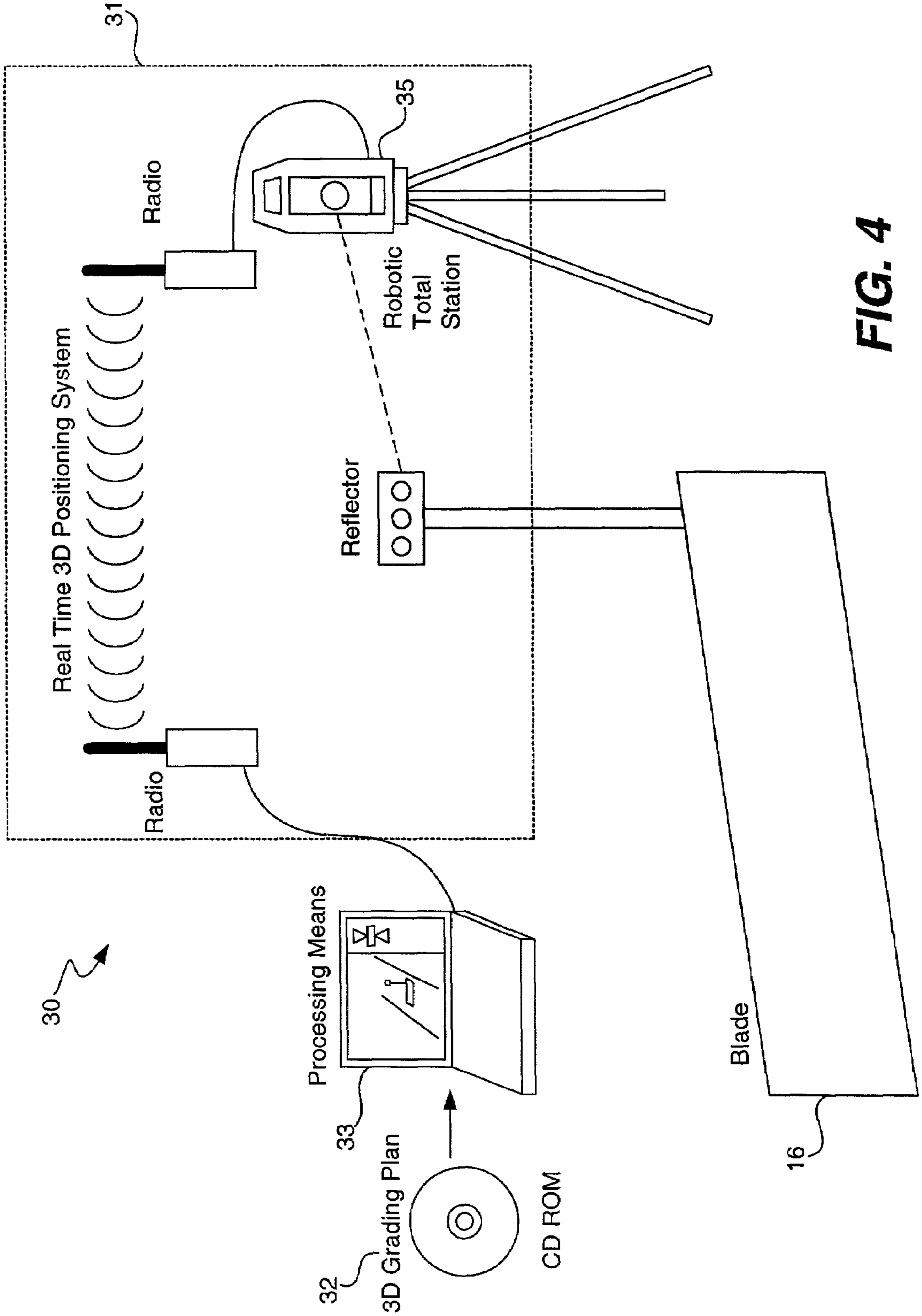
FIG. 4 is a schematic diagram of a conventional optical real time three dimensional grade guidance system.

Briefly, to perform three dimensional grading, a three dimensional grading guidance system 63, such as guidance system 30 described above and as shown in FIG. 4, is applied to measure the horizontal position of the earth moving vehicle 52, as well as the elevation of the grading implement. As will be described in greater detail below, once these measured coordinates are determined, they can be compared to a database of the three-dimensional site plan of the desired contour to determine an elevation error of the grading implement according to the difference between the measured and desired elevations thereof at the measured horizontal position. The adapter interface control device 60, being responsive to the elevation error, generates a correction signal that automatically adjusts the operation and transmission of the one or more energy beams onto the energy beam receiver to control the elevation change of the grading implement to reduce the elevation error.

Through the application of the present inventive optical interface adapter and a database of the three-dimensional site plan, accordingly, the sophisticated, precise, three dimensional grading guidance systems 63 (system 30 in FIG. 4) can be optically interfaced to the widely applied energy beam receivers of the planar automatic laser grading systems 64, such as grading system 10 described above and as shown in FIG. 1, for simple control of the grading implement. Hence, the optical interface of the present invention provides an inexpensive, universal ability to update these common planar, automatic laser grading control systems to three-dimensional control systems of the grading implement, based on GPS or robotic total stations.

Referring now to FIGS. 5–7, a laser beam receiver 53 of the automatic grading system is illustrated in detail. The detection portion 56 thereof is preferably provided by an array of photocells or photodetectors 65, or other sensors, that are selected to be responsive to the impinging energy from an incident datum laser beam. The corresponding conventional rotating laser beacon of the automatic grading system typically sweeps the datum laser beam in a datum plane with a rotating frequency or pulse rate in the range of about 5 Hz to about 15 Hz (i.e., about 300 rpm to about 900 rpm).

Typically, these type of receiver designs are mounted to an extensible rod 66 which serves to support the laser beam receiver 53 at the proper elevation for intercepting the datum laser beams. In the present invention, of course, since the optical interface apparatus 62 is carried by the earth moving machine, and more preferably, mounted directly to the receiver, it does not matter what elevation the receiver is positioned as long as the optical interface is optically aligned therewith.

A support housing 67 of the typical laser beam receiver 53 (FIG. 8) generally supports the arrays of photodetectors 65 which are arranged in two to four vertical columns, depending upon the number of sides, enclosed within a transparent casing 68 thereof. Each column is composed of a like number of photodetectors 65 in vertical alignment, and positioned at a designated level. The photodetectors 65 on each level may be connected in common to a circuit shown in block form in FIG. 9 because the laser beam receiver 53 needs to detect the heights at which the laser beams strike, but not the orientations. Moreover, the adjacent levels of photodetectors 65 are usually subdivided into control groups (i.e., Coarse Raise (**65*d*), Fine Raise (65*b*), Fine Lower (65*c*) and Coarse Lower (65*e***)), in one specific embodiment, each of which are also all connected in common to a respective control circuit.

For example, at the center of each column of photodetectors are one or more levels of "On-Grade" center detectors **65*a* which correspond to "On-Grade" detection of the grading implement. These center detectors 65*a* are coupled to an "On-Grade" detector circuit 70*a* which in turn is coupled to the implement control device 61. When activated, the implement control device instructs the hydraulic valve 71 and hydraulic ram 72** to neither raise nor lower the grading implement since the measured elevation thereof is determined to be at the correct grade.

Located adjacent to and directly above the "On-Grade" group of center detectors **65*a* is a group of "Fine-Raise" detectors 65*b*. Depending upon the laser receiver make and model, this group may include two-four levels of photodetectors 65 which are coupled to a common "Fine-Raise" circuit 70*b*. Energy beam detection's at these levels indicate that the measured elevation of the blade is slightly lower than that of the desired plan site. Accordingly, this circuit is coupled to the implement control device 61 which instructs the hydraulic valve 71 and hydraulic ram 72** to raise the grading implement in fine increments since the measured elevation thereof is only slightly lower than desired.

Similarly, located adjacent to and directly below the group of center detectors 65*a* is a group of "Fine-lower" detectors 65*c* which are coupled to a common "Fine-lower" circuit 70*c*. This circuit would be activated when the measured position of the grading implement is slightly higher than that of the desired plan site. Thus, operation of this circuit 70*c* which in turn is coupled to the implement control device 61 would instruct the hydraulic valve 71 and hydraulic ram 72 to minutely lower the grading implement in fine increments to position the grading implement at the desired elevation during grading.

Figure 8:
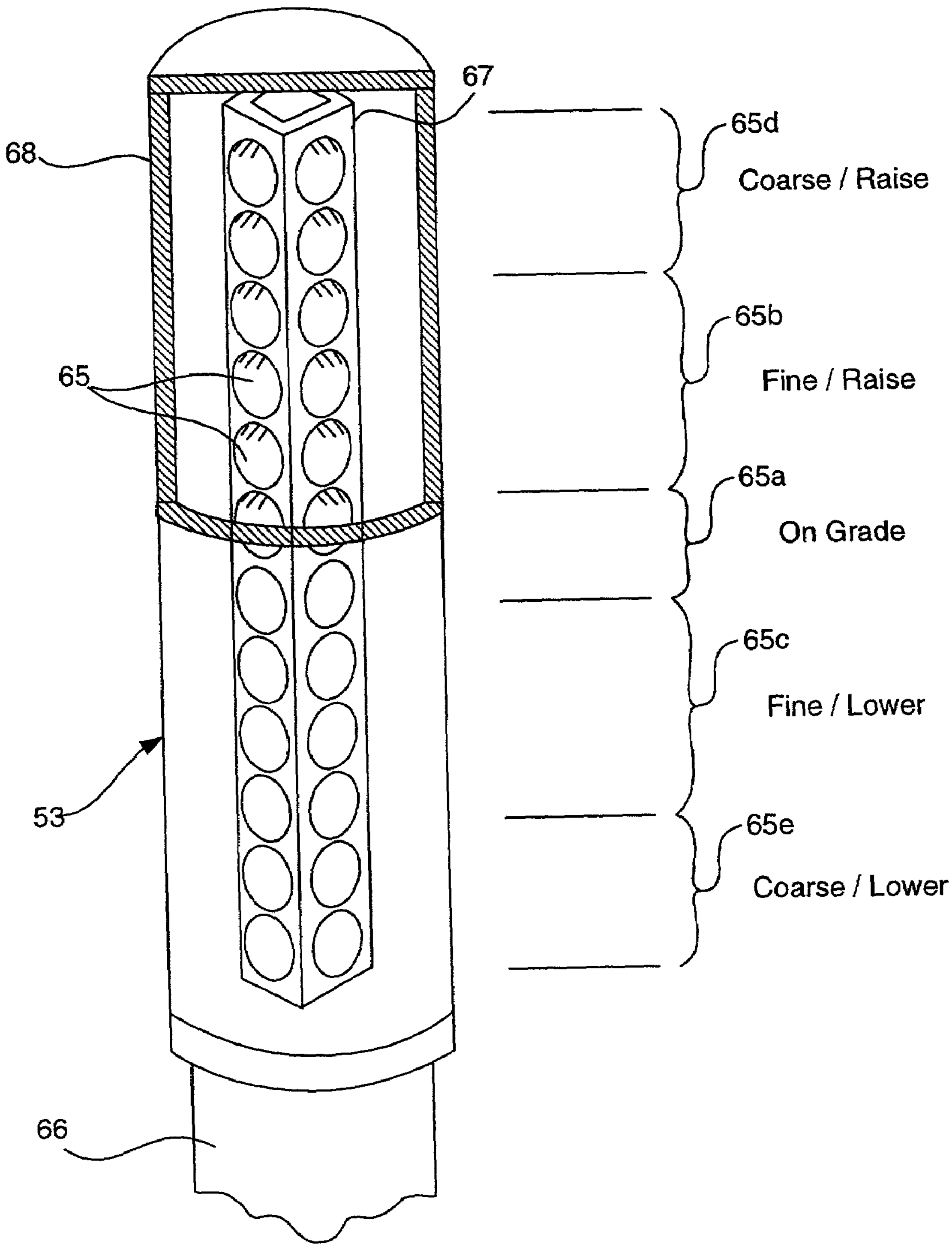
FIG. 8 is a top perspective view, partially broken-away, of a laser receiver component of the control system of the present invention of FIG. 5.
Figure 9:
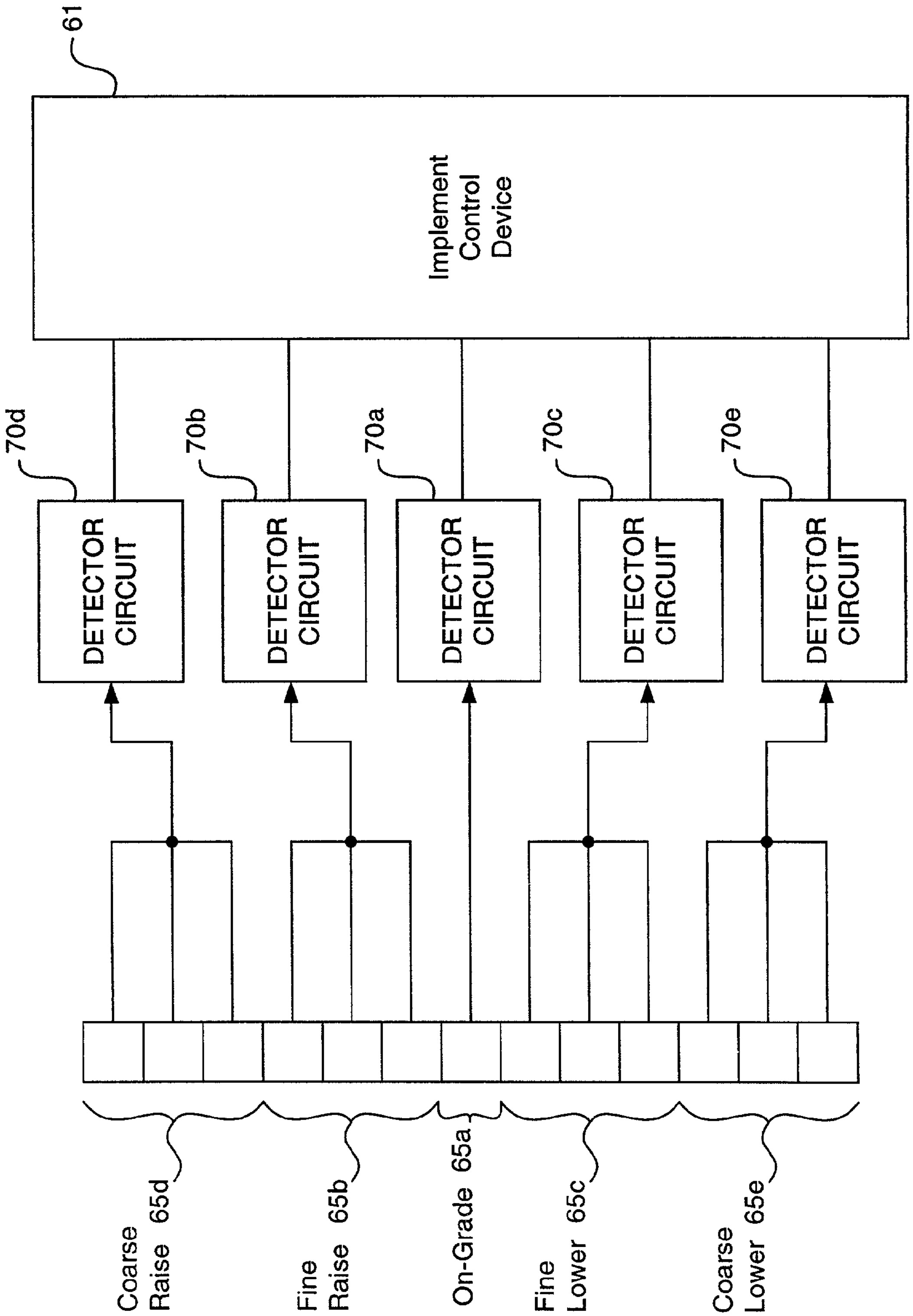
FIG. 9 is a circuit diagram of the laser receiver component of FIG. 8.

As shown in FIG. 8, directly above and adjacent to the group of "Fine-Raise" detectors 65*b* are the group of "Coarse-Raise" detectors 65*d*. This group may include two-four levels of photodetectors 65 which in turn are coupled to a common "Coarse-Raise" circuit 70*d*. When these photodetectors detect the datum laser, this represents that the blade or grading implement is significantly lower than the desired elevation. The hydraulic valve 71 and hydraulic ram 72 would then be instructed to raise the grading implement in coarser (greater) increments since the measured elevation thereof is too low.

Finally, located adjacent and directly below the group of "Fine-Lower" detectors 65*c* is a group of "Coarse-lower" detectors 65*e* which are coupled to a common "Coarse-lower" circuit 70*e*. In contrast to the Coarse-Raise" circuit 70*d*, the "Coarse-lower" circuit 70*e* coupled to the implement control device 61, when activated, instructs the hydraulic valve 71 and hydraulic ram 72 to lower the grading implement in coarser (greater) increments since the measured elevation thereof is much too high.

By selective operation of the optical interface apparatus 62 of the present invention, accordingly, the selected groups of photodetectors 65(*a–e*) can be pulsed for precise elevation operation of the grading implement. As briefly mentioned above, the implement control device 61 is utilized to automatically control the height of the grading implement 51 as a function of the measured horizontal position of the earth grading vehicle and the elevation of the grading implement as determined by the three dimensional grading guidance systems, and as compared to the three dimensional computer model 73 of the grading plan.

The implement control device 61 is preferably a hydraulic control device that, in response to an elevation or correction error signal as detected by the circuits 70*a*–70*e* of the laser beam receiver 53, causes the hydraulic cylinders of the earth moving vehicle 52 to vary the height of the grading implement in such a way as to reduce or eliminate the elevation error. If the elevation error is of greater magnitude, which may occur if a large cut or fill is required at that vehicle position, the capabilities of the earth-moving vehicle may dictate that several grading passes will be required to produce the desired graded surface. In such a case, the implement control device 61 would reposition the grading implement 51 for that particular grading pass at a position that reduces but does not totally eliminate the elevation error.

Referring now to FIG. 6, the universal optical interface apparatus 62 is illustrated having a housing 75 which supports the energy source 58 therein. A relatively planar face portion 76 of the housing 75 is adapted to universally abut against or be placed adjacent the transparent casing 68 of the energy beam receivers 53 so that the energy source 58 can optically interface with the photodetectors 65 of the receiver. Since the transparent casings 68 of the energy beam receivers are often curvilinear, a pair of spaced apart vertical rib members 77 extend outwardly from the face portion 76 of the housing to promote seating when against the receiver.

To universally mount the housing 75 of the interface apparatus 62 to the transparent casing 68 of any one of the energy receivers 53, a pair of removable straps 78 are provided to extend around the casing. In one specific embodiment, the straps 78 may be provide by any organic or inorganic material typically used for strap materials. An adhesive or VELCRO® type fastening mechanism can be employed to removably mount the optical interface apparatus to the energy receiver. It will be appreciated, however, that any other mounting devices, such as bolts, latches or the like may be applied.

FIG. 6 best illustrates that the energy source 58 extends longitudinally along the face portion 76 of the housing 75. Broadly, this energy source may be provided by any device which is capable of pulsing one or more energy beams strategically onto the selected photodetectors 65 of the energy beam receiver to simulate impingement or striking of the laser beacon. One example may be a single energy source pivotally mounted to face portion 76, and which is operably coupled to a control mechanism capable of aiming the energy beam at the appropriate photodetector 65. Another example of a single energy source may be one which is slideably mounted to the face portion 76 of the housing along a track mechanism. In this application, the sliding energy source would similarly be operably coupled to a control mechanism capable of positioning the energy source longitudinally along the face portion to aim the energy beam at the appropriate photodetector 65.

Preferably, however, the energy source 58 is provided by an elongated light strip positioned longitudinally along the face portion 76 of the housing 75. This light strip includes a plurality of illumination devices or pulsed light emitters 80 aligned in a linear array along the housing. While these emitters can be any light emitting device, they are preferably provided by Light Emitting Diodes (LEDs). Each pulsed light emitter 80 is adapted to generate an independent energy beam which corresponds to a respective photodetector 65 for elevation control. As best viewed in FIG. 6, six (6) illumination devices or pulsed light emitters 80 are provided which are spaced-apart at predetermined distances from a center line of the face portion 76.

In one specific embodiment, two vertically spaced, "On-Grade" pulsed light emitters 80*a*' and 80*a*" are centrally positioned along the linear array which correspond to the "On-Grade" group of center detectors 65*a* of the energy beam receiver 53. Spaced apart from and positioned above the upper "On-Grade" pulsed light emitter 80*a*' is a "Fine Raise" pulsed light emitter 80*b* which corresponds to the "Fine Raise" group of detectors 65*b*, while a "Fine Lower" pulsed light emitter 80*c*, positioned below the lower "On-Grade" pulsed light emitter 80*a*", corresponds to the "Fine Lower" group of detectors 65*c* of the energy beam receiver. A "Coarse Raise" pulsed light emitter 80*d* is provided above the "Fine Raise" pulsed light emitter 80*b* to energize the "Coarse Raise" group of detectors 65*d*. Lastly, a "Coarse Lower" pulsed light emitter 80*e* is positioned below the "Fine Lower" pulsed light emitter 80*c* to energize the "Coarse Lower" group of detectors 65*e*.

Thus, when the optical adapter assembly 57 is properly aligned with photodetectors 65 of the energy beam receiver, it can subsequently be removably mounted to the housing 75 there, via straps 78. One technique is to pulse the "on-grade" correction which illuminates the two center "On-Grade" pulsed light emitters 80*a*' and 80*a*", while moving the adapter up and down in front of the laser receiver cells to center it in the interval where the grading implement neither raises nor lowers. Essentially, the "On-Grade" pulsed light emitters 80*a*' and 80*a*" are being centered with the "On-Grade" group of center detectors 65*a* of the energy beam receiver 53. Consequently, by selective activation of a pulsed light emitter 80*a*'–80*e* to illuminate a selected group of photodetectors, the elevation of the grading implement can be controlled.

As mentioned, the light strip includes two pulsed light emitters 80*a*' and 80*a*", which simulate the "On-Datum" plane, to assure illumination of the "On-Grade" group of center detectors 65*a* when the measured elevational position of the grading implement is "On-Grade", and to further facilitate alignment therewith. By comparison, only one illumination device (i.e., 80*b*–80*e*) is designated for each of the other group of detectors (65*b*, 65*c*, 65*d* and 65*e*) for activation illumination thereof.

As best viewed in FIG. 6, the vertical spacing of the "Coarse Raise" emitter 80*d* and the "Coarse Lower" emitter 80*e* from the "Fine Raise" emitter 80*b* and the "Fine Lower" emitter 80*c*, respectively, is greater than the vertical spacing of the "Fine Raise" emitter 80*b* and the "Fine Lower" emitter 80*c* from the respective "On-Grade" emitter 80*a*' and 80*a*". Spatially, by increasing the vertical spacings of the "Coarse Raise" emitter 80*d* and the "Coarse Lower" emitter 80*e* from the "Fine Raise" emitter 80*b* and the "Fine Lower" emitter 80*c*, respectively, this arrangement increases the probability that the "Coarse Raise" emitter 80*d* and the "Coarse Lower" emitter 80*e* will illuminate the corresponding "Coarse" photodetectors 65*d*, 65*e*, respectively, while the "Fine Raise" emitter 80*b* and the "Fine Lower" emitter 80*c* will illuminate the corresponding "Fine" photodetectors 65*b*, 65*c*, respectively, over a broader range of variable distances. Accordingly, the enables the universal optical adapter assembly 57 to optically interface with a greater range of energy beam receivers.

Typically, most energy beam receivers 53 are responsive to the periodic strobing burst as the energy from the rotating laser beacon strikes the receiver. Thus, the correction signals of the light emitters 80 are pulsed in such a way as to simulate the strobe of a rotating laser beacon as the energy beam strikes the photocells 65 of the laser beam receiver 53. To adapt to a wide range of energy beam receivers, the interface control device 60 is configured to manually and/or automatically adjust or fine tune the pulse rate of the correction signal. For example, the correction signals can be adjusted to pulse at a rate in the range of about 5 Hz to about 15 Hz, and more preferably at about 10 Hertz, with an ON duty cycle of approximately 5%. Thus, the optical adapter assembly 57 allows a three dimensional grade guidance system 63 to be quickly interfaced—temporarily or permanently—to a variety of makes of automatic laser grade control systems already installed on construction equipment.

While the light strip of the optical adapter references at least six pulsed light emitter 80*a*'–80*e*, it will be appreciated that more or less emitters may be provided to provide either a coarser or finer cooperative control of the laser beam receiver 53. By way of example, only two vertically oriented pulsed light emitters (i.e., an upper and lower light emitter) may be provided to interface with the energy beam receiver. In this application, both light emitters may be pulsed simultaneously for an "On-Grade" correction, while only the upper light emitter would be pulsed for a "Fine Raise" or "Coarse Raise" correction, depending upon the emitter position and only the lower light emitter would be pulsed for a "Fine Lower" or "Coarse Lower" correction. In a similar configuration, only three pulsed light emitters may be provided which would include an upper, middle and lower emitter.

The optical interface apparatus 62 is operably coupled to a remote processing unit 81 which is coupled to a data base containing the three dimensional computer model 73 of the grading plan. This model, in a nut shell, includes the desired contour for the corresponding tract of land which is defined in terms of the desired elevation (e.g., Z coordinate) of the graded tract with respect to the planar position (e.g., X coordinate, Y coordinate). Hence, as will be described in greater detail below, the remote processing unit 81 communicates with the three dimensional grading guidance system 63, via a radio signal transceiver 82, to receive the measured coordinates and elevation of the grading implement. The remote processing unit 81 then calculates the difference in the elevation measured from that of the three dimensional computer model at the same horizontal coordinates. Depending upon the measured difference from the "On-Grade" determination, the interface control device 60 will operate one of the pulsed light emitters to pulse the energy beam. Essentially, the optical interface apparatus 62 of the adapter assembly 57 directly transmits the elevation correction signal to the selected photodetectors of the energy beam receiver 53. By way of example, for measured elevation differences from the grading plan of greater than about 0.2 feet, the interface control will operate the "Coarse" light emitters 80*d* and 80*e*, while for measured elevation differences of between about 0.02 feet about 0.2 feet, the "Fine" light emitters 80*b* and 80*c* might be pulsed. These increments may be set by the operator for machine requirements.

In one specific example, as viewed in FIG. 7, the remote processing unit 81 provided by a portable computer 83 or the like mounted to or carried by the earth grading vehicle. The optical interface apparatus 62 includes the interface control device 60 (FIG. 10) which is easily coupled to the portable computer 83 using the parallel, serial or USB port 84.

In accordance with the present invention, the optical adapter assembly 57 couples the implement control system of the planar automatic grading system 64 to a three dimensional grading guidance system 63, such as an optical, real time, three dimensional grading guidance system (FIGS. 4 and 5) or a real time, kinematic GPS, three dimensional grading guidance system. As mentioned, the optical interface apparatus 62 optically interfaces this three dimensional grading guidance system (hereinafter "position sensing apparatus 63) to the laser beam receiver 53

Regardless of which 3-D position sensing apparatus 63 is employed to determine the real-time horizontal coordinates of the earth moving vehicle 52 and the elevation of the grading implement 51, the system includes a reference station 85 and a portable sensing station 86, carried by the earth moving vehicle 52. The portable sensing station 86 in turn includes a radio transceiver 82, for receiving the real time measured horizontal coordinates and measured elevation thereof, coupled to the portable computer 83 for processing and storing the grading plan in the data base. The position of the reference station 85 is known either by placing the reference station at a known location relative to some origin or reference coordinate system, or by placing the reference station at unknown location and subsequently determining the position of the reference station by a calibration procedure, which will be described below in further detail.

As will be apparent from the following description, in an optical, real time, three dimensional grading guidance system such as a robotic total station, the position sensing apparatus 63 is operable for determining the horizontal position of the portable sensing station 86 with respect to the horizontal position of the reference station 85, and is also operable for determining the elevation at the portable sensing station with respect to the elevation of the reference station.

The portable sensing station 86 for a robotic total station, as best illustrated in FIGS. 5 and 7, in addition to the radio transceiver 82 and portable computer 83, includes a reflector device 87 for reflecting an energy beam back toward its source or origin for reflective detection thereof. This reflector device 87 is preferably coupled to the grading implement 51 (E.g., the machine blade) so that the elevation of the bottom edge of the blade can be measured. Preferably, this reflector device 87 can be mounted to the top of the same rod or mast 66 that the energy beam receiver is mounted to. Typical of such commercially available reflectors is the Lecia 360 Reflector Prism by Lecia Geosystems of Heerbrugg, Switzerland.

The fixed reference station 85, as mentioned, may be provided by a robotic total station or a tracking total station, the primary difference being whether the total station incorporates a transceiver 91 to communicate with the transceiver 82 of the portable sensing station 86. For brevity, only a robotic total station will be discussed.

Briefly, the robotic total station 85 of FIGS. 5 and 7 includes a laser transmitter 88, a laser detector 90, and radio transceiver 91 that is coupled to the laser detector 90, as shown in FIGS. 5 and 7. The laser transmitter 88 projects an energy beam 55 which locates and strikes the reflector device 87 of the portable sensing station 86. The reflection is detected by the laser detector 90 at the reference station 85, which then locks onto and tracks the movement of the reflector device 87.

From the reflection of the energy beam back to the laser detector 90, a processor 89 of the reference station 85 can calculate the distance and angle information of the reflector device 87 relative the laser transmitter 88. Further, through the application of the principles of geometry and trigonometry, and the fixed position of the reference station, the position or location of the grading implement can be represented in a variety of three-dimensional coordinate systems such as X, Y, Z, or R, θ, Z, where X, Y, Z denotes a Cartesian coordinate system in which the X-Y plane is horizontal and the Z-axis is vertical, and where R, θ, Z denotes a cylindrical coordinate system in which the R-θ plane is horizontal and the Z axis is vertical. The X, Y or R, θ coordinates are measured in a horizontal plane with respect to some bench mark position, while the Z coordinate is the elevation measured with respect to some horizontal reference plane, such as mean sea level.

The reference station 85 includes a housing 92 that is supported in an upright orientation by a tripod 93, shown in FIG. 5. Within the housing 93 is a laser source of the laser transmitter 88 that typically projects a laser beam vertically upward to a movable lens operated by servo motors, which reflects the laser beam at reflector device 87 when the system is "locked-on" to the reflector device 87. Once the tracking mechanism of the reference station 85, coupled to the laser detector 90, locks onto the reflection of the reflector device 87, the tracking mechanism operates servo motors to automatically track the reflector device 87.

Commercial examples of robotic total stations similar to the reference station 85 applied herein are the APLI model available from Topcon Instruments of Pleasanton, Calif.; the Trimble 5600 from Trimble Navigation Limited of Sunnyvale, Calif.; and the TCRA 1103 from Leica Geosystems of Heerbrugg, Switzerland. Briefly, while not described in detail, commercial examples of real time kinematic GPS system include those provided by Trimble, Topcon and Lecia as well.

The portable sensing station 86 further includes a radio signal transceiver 82, having a receiving antenna 95, which is responsive to the radio signal broadcast by the radio signal transceiver 91, via antenna 94, of the reference station 85. In one specific embodiment, the portable sensing station 86 may include an elevation correction measuring device to measure the vertical distance between the reflector device 87 and the blade edge 96 of the grading implement 51 which grades the surface of the tract. This elevation correction (Z) is necessary since the reference station 85 only measures the elevation of the reflector device 87 rather than from the elevation of the blade edge 96.

The elevation correction measuring device may be as simple as indicia or a tape measure on the extensible rod 66 supporting the laser beam receiver 53 and the reflector device 87. Thus, the extensible rod 66 may be extended to facilitate interception and reflection of the laser beam 55 in an area of significant elevation changes and/or hills which may otherwise impede interception of the beam with the reflector.

The radio signal transceiver 82, the elevation correction measuring device and the optical adapter assembly 57 are operably coupled to the portable computer 83 (FIGS. 5 and 7). As the radio signal transceiver 82 receives the broadcast of the three-dimensional coordinates of the earth moving vehicle and grading implement from the radio signal transceiver 91, the processing unit 81 of the computer 83 compares these coordinates to the database 73 of the three-dimensional site plan of the desired contour. The elevation error of the grading implement can then be determined according to the difference between the measured and desired elevations thereof at the measured horizontal position.

Figure 10:
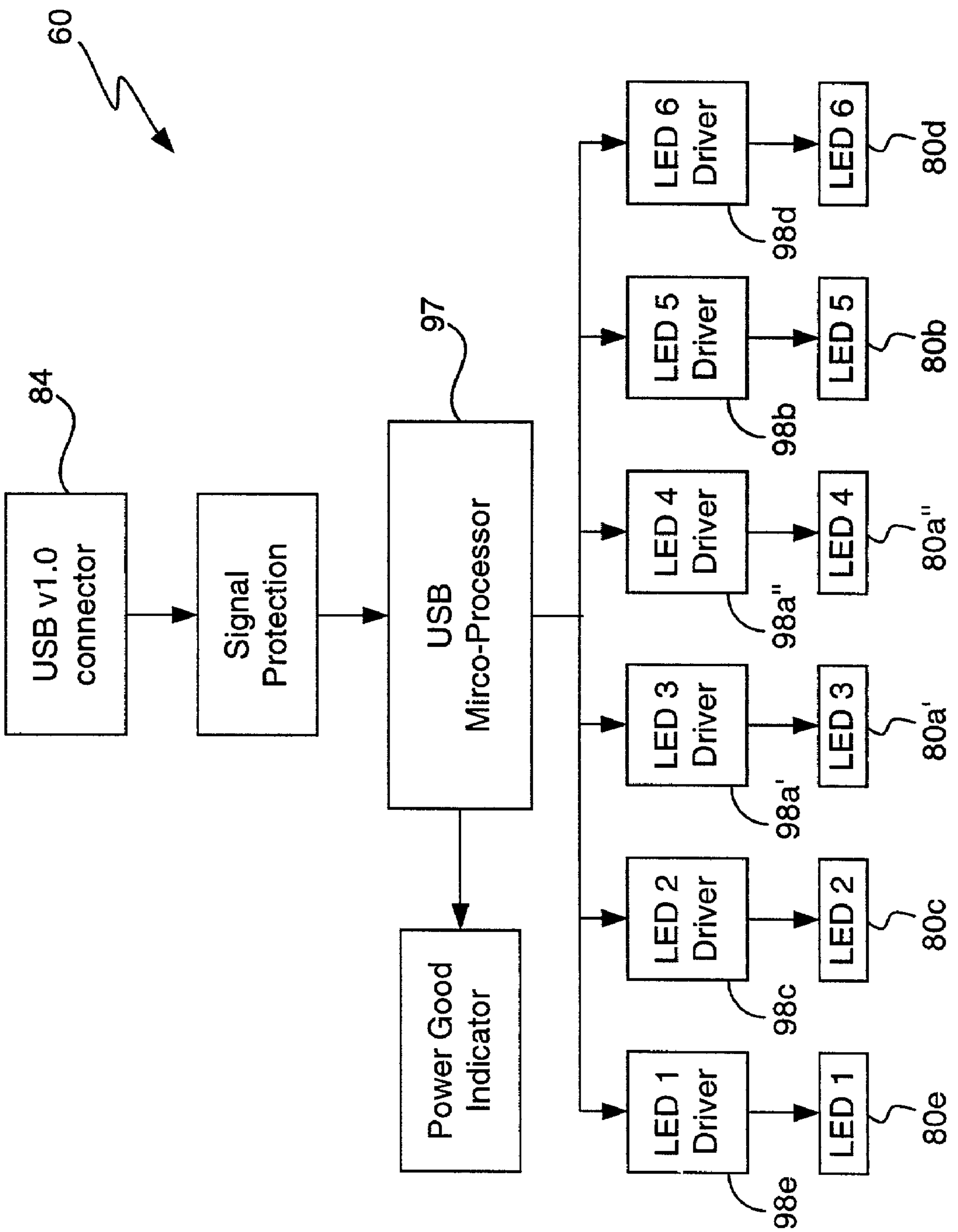
FIG. 10 is a circuit diagram of the optical interface apparatus of FIG. 6.

The adapter interface control device 60, being responsive to the elevation error calculated by processor 81, then automatically adjusts the operation and transmission of illumination devices 80 of the optical interface apparatus 62 to control the elevation change of the grading implement to reduce the elevation error. Referring now to FIGS. 7 and 10, the elevation error signal from computer 83 is sent to the interface control processor 97 of the interface control device 60, via, connector 84 for subsequent processing. Depending upon the magnitude of the elevation error, the interface control processor 97 instructs one of the LED Drivers **98*a*–98*e* to drive the corresponding light emitter 80*a*–80*e*. For example, either a "Coarse Raise" or "Coarse Lower" correction signal is projected onto the corresponding photodetector 65*d*, 65*e*, or a "Fine Raise" or "Fine Lower" correction signal is projected onto the corresponding photodetector 65*b*, 65*c*. Should the elevation error be within an acceptable limit, the "On-Grade" illumination devices 80*a*', 80*a*"** will be activated.

Accordingly, the universal optical adapter assembly 57 is adapted to pulse the appropriate emitters **80*a*–80*e* of the optical interface apparatus 62 which are sensed by the corresponding photodetectors 65*a*–65*e* of the energy beam receiver 53 of the planar automatic laser grading systems 64. In turn the hydraulic valve 71 is simply controlled to raise or lower the blade 51 of the motorgrader or dozer 52**.

By optically interfacing the three dimensional grading guidance system 63, via the universal optical adapter assembly 57, to the planar grading system of the of the automatic laser grading system 64, true three dimensional control for grading can be applied to this planar grading system. Thus, this optical interface provides an inexpensive, universal retrofit device to update existing planar laser machine control systems to three-dimensional control systems based upon GPS or robotic total stations.

From the above description, it will be apparent that the invention disclosed herein provides a novel and advantageous three-dimensional position sensing apparatus and method utilizing laser reference stations and one or more portable position sensors. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A universal optical adapter assembly for use with a planar automatic grading system for an earth-moving vehicle having a grading implement that defines a graded surface, said automatic grading system including an energy beam receiver mounted on the earth-moving vehicle and operable for detecting the height at which a datum energy beam strikes said receiver along a detection portion thereof, and a control device operably coupled to said energy beam receiver and the grading implement to control the elevation of the grading implement in response to the position at which the datum energy beam strikes said detection portion of said energy beam receiver, said optical interface adapter assembly comprising:

an optical interface apparatus configured to be carried by said earth moving vehicle during movement thereof and adapted to cooperate with the energy beam receiver, said interface apparatus having an energy source emitting one or more implement controlling energy beams strategically onto selected positions of the detection portion of the energy beam receiver to control the elevation of the grading implement.

2. The optical adapter assembly according to claim 1, wherein said energy source includes an elongated light strip adapted to selectively transmit the one or more controlling energy beams longitudinally therealong and strategically onto selected positions of the detection portion for detection thereof.

3. The optical adapter assembly according to claim 2, wherein said light strip includes a plurality of illumination devices aligned in an array longitudinally along said optical interface apparatus.

4. The optical adapter assembly according to claim 3, wherein said optical interface apparatus includes a housing containing the array of illumination devices longitudinally along a face portion thereof.

5. The optical adapter assembly according to claim 3, further including control circuitry coupled to the array of illumination devices for selective control thereof.

6. The optical adapter assembly according to claim 4, wherein said face portion is adapted to mount substantially adjacent to the detection portion of the energy beam receiver to facilitate the transmission of said one or more controlling energy beams from the optical interface apparatus to the energy beam receiver.

7. The optical adapter assembly according to claim 1, further including:

a mounting device configured to mount the interface apparatus substantially adjacent to the detection portion of the energy beam receiver.

8. The optical adapter assembly according to claim 7, wherein said mounting device is adapted to mount the interface apparatus directly to the energy beam receiver.

9. The optical adapter assembly according to claim 8, wherein the mounting device includes one or more strap devices.

10. The optical adapter assembly according to claim 1, wherein said optical interface apparatus is adapted to pulse the one or mote controlling energy beams.

11. The optical adapter assembly according to claim 1, wherein said optical interface apparatus is adapted to adjust the pulse rate of the one or more controlling energy beams to simulate a strobe of a rotating laser beacon.

12. The optical adapter assembly according to claim 11, wherein said pulse rate is in the range of about 5 Hz to about 15 Hz.

13. The optical adapter assembly according to claim 12, wherein said pulse rate is in the range of about 10 Hz with an ON duty cycle of about 5%.

14. The optical adapter assembly according to claim 1, wherein said energy source includes a plurality of pulsed light emitters aligned in an array longitudinally along said optical interface apparatus to strategically pulse the one or more controlling energy beams onto selected longitudinal positions of the detection portion for detection thereof.

15. The optical adapter assembly according to claim 14, wherein said optical interface apparatus is adapted to adjust the pulse rate of the one or more controlling energy beams to simulate a strobe of a rotating laser beacon.

16. The optical adapter assembly according to claim 14, wherein said pulsed light emitters are provided by Light Emitting Diodes (LEDs).

17. The optical adapter assembly according to claim 14, wherein said energy source includes two vertically oriented pulsed light emitters.

18. The optical adapter assembly according to claim 14, wherein said energy source includes three vertically oriented pulsed light emitters positioned in linear alignment.

19. The optical adapter assembly according to claim 14, wherein said energy source includes;

one or more central pulsed light emitters corresponding to an "on-grade" correction portion of the receiver detection portion, one or more upper pulsed light emitters positioned vertically above the central pulsed light emitters which correspond to a "raise" implement correction portion of the receiver detection portion, and one or more lower pulsed light emitters positioned vertically below the central pulsed light emitters which correspond to a "lower" implement correction portion of the receiver detection portion.

20. The optical adapter assembly according to claim 19, wherein said upper pulsed light emitters include:

one or more "fine grade" upper emitters positioned vertically above the central pulsed light emitters which correspond to a "fine raise" implement correction portion of the receiver detection portion, and one or more "coarse grade" upper emitters positioned farther vertically above the "fine grade" upper emitters which correspond to a "come raise" implement correction portion of the receiver detection portion; and said lower pulsed light emitters include:

one or more "fine grade" lower emitters positioned vertically below the central pulsed light emitters which correspond to a "fine lower" implement correction portion of the receiver detection portion, and one or more "coarse grade" lower emitters positioned further vertically below the "fine grade" lower emitters which correspond to a "coarse raise" implement correction portion of the receiver detection portion.

21. The optical adapter assembly according to claim 20, wherein said "coarse grade" upper emitters are vertically spaced apart from said "fine grade" upper emitters by a distance greater than the "fine grade" upper emitters are vertically spaced apart from the central pulsed light emitters, and said "coarse grade" lower emitters are vertically spaced apart from said "fine grade" lower emitters by a distance greater than the "fine grade" lower emitters are vertically spaced apart from the central pulsed light emitters.

22. The optical adapter assembly according to claim 1, further including:

an adapter control device coupled to said energy source and adapted to control the impingement of the one or more energy beams strategically onto selected positions of the receiver detection portion to control the elevation of the grading implement.

23. The optical adapter assembly according to claim 22, further including:

a grading data base adapted to define the desired elevation of the grading implement as a function of a measured position of the earth-moving vehicle; and said adapter control device includes a processing device operably coupled to the data base to determine an elevation error of the grading implement according to the difference between the measured and desired elevations thereof, said adapter interface control device being responsive to the elevation error to automatically adjust the operation of the one or more energy beams and control the elevation of the grading implement to reduce the elevation error.

24. A universal optical adapter assembly for use with a planar automatic grading system for an earth-moving vehicle having a grading implement that defines a graded surface, said automatic grading system including an energy beam receiver mounted on the earth-moving vehicle and operable for detecting the height at which a datum energy beam strikes said receiver along a detection portion thereof, and a control device operably coupled to said energy beam receiver and the grading implement to control the elevation of the grading implement in response to the position at which the datum energy beam strikes said detection portion of said energy beam receiver, said optical interface adapter assembly comprising:

an optical interface apparatus adapted to cooperate with the energy beam receiver, and having a plurality of illumination devices aligned in an array longitudinally along said optical interface apparatus, the array of illumination devices being configured to emit one or more implement controlling energy beams strategically onto selected positions of the detection portion of the energy beam receiver to control the elevation of the grading implement.

25. The optical adapter assembly according to claim 24, wherein said optical interface apparatus includes a housing containing the array of illumination devices longitudinally along a face portion thereof.

26. The optical adapter assembly according to claim 25, wherein said face portion is adapted to mount substantially adjacent to the detection portion of the energy beam receiver to facilitate the transmission of said one or more controlling energy beams from the optical interface apparatus to the energy beam receiver.

27. The optical adapter assembly according to claim 24, further including:

a mounting device configured to mount the interface apparatus substantially adjacent to the detection portion of the energy beam receiver.

28. The optical adapter assembly according to claim 27, wherein said mounting device is adapted to mount the interface apparatus directly to the energy beam receiver.

29. The optical adapter assembly according to claim 28, wherein the mounting device includes one or more strap devices.

30. The optical adapter assembly according to claim 24, wherein said optical interface apparatus is adapted to pulse the one or more controlling energy beams.

31. The optical adapter assembly according to claim 24, wherein said optical interface apparatus is adapted to adjust the pulse rate of the one or more controlling energy beams to simulate a strobe of a rotating laser beacon.

32. The optical adapter assembly according to claim 31, wherein said pulse rate is in the range of about 5 Hz to about 15 Hz.

33. The optical adapter assembly according to claim 32, wherein said pulse rate is in the range of about 10 Hz with an ON duty cycle of about 5%.

34. The optical adapter assembly according to claim 24, wherein said illumination devices are provided by pulsed light emitters.

35. The optical adapter assembly according to claim 34, wherein said pulsed light emitters are provided by Light Emitting Diodes (LEDs).

36. The optical adapter assembly according to claim 24, further including:

control circuitry coupled to the array of illumination devices for selective control thereof.

37. The optical adapter assembly according to claim 24, wherein said illumination devices include:

one or more central pulsed light emitters corresponding to an "on-grade" correction portion of the receiver detection portion, one or more upper pulsed light emitters positioned vertically above the central pulsed light emitters which correspond to a "raise" implement correction portion of the receiver detection portion, and one or more lower pulsed light emitters positioned vertically below the central pulsed light emitters which correspond to a "lower" implement correction portion of the receiver detection portion.

38. The optical adapter assembly according to claim 37, wherein said upper pulsed light emitters include:

one or more "fine grade" upper emitters positioned vertically above the central pulsed light emitters which correspond to a "fine raise" implement correction portion of the receiver detection portion, and one or more "coarse grade" upper emitters positioned further vertically above the "fine grade" upper emitters which correspond to a "coarse raise" implement correction portion of the receiver detection portion; and said lower pulsed light emitters include:

one or more "fine grade" lower emitters positioned vertically below the central pulsed light emitters which correspond to a "fine lower" implement correction portion of the receiver detection portion, and one or more "coarse grade" lower emitters positioned further vertically below the "fine grade" lower emitters which correspond to a "coarse raise" implement correction portion of the receiver detection portion.

39. The optical adapter assembly according to claim 38, wherein said "coarse grade" upper emitters are vertically spaced apart from said "fine grade" upper emitters by a distance greater than the "fine grade" upper emitters are vertically spaced apart from the central pulsed light emitters, and said "coarse grade" lower emitters are vertically spaced apart from said "fine grade" lower emitters by a distance greater than the "fine grade" lower emitters are vertically spaced apart from the central pulsed light emitters.

40. The optical adapter assembly according to claim 24, further including:

an adapter control device coupled to said illumination devices and adapted to control the impingement of the one or more energy beams strategically onto selected positions of the receiver detection portion to control the elevation of the grading implement.

41. The optical adapter assembly according to claim 40, further including:

a grading data base adapted to define the desired elevation of the grading implement as a function of a measured position of the earth-moving vehicle; and said adapter control device includes a processing device operably coupled to the data base to determine an elevation error of the grading implement according to the difference between the measured and desired elevations thereof said adapter interface control device being responsive to the elevation error to automatically adjust the operation of the one or more energy beams and control the elevation of the grading implement to reduce the elevation error.

42. A universal optical adapter assembly for use with a planar automatic grading system for an cart-moving vehicle having a grading implement that defines a graded surface, said automatic grading system including an energy beam receiver mounted on the eat-moving vehicle and operable for detecting the height at which a datum energy beam strikes said receiver along a detection portion thereof, and a control device operably coupled to said energy beam receiver and the grading implement to control the elevation of the grading implement in response to the position at which the datum energy beam strikes said detection portion of said energy beam receiver, said optical interface adapter assembly comprising:

an optical interface apparatus adapted to mount to the energy beam receiver, and having an energy source emitting one or more implement controlling energy beams strategically onto selected positions of the detection portion of the energy beam receiver to control the elevation of the wading implement; and a mounting device configured to mount the interface apparatus directly to and in face-to-face orientation with said energy beam receiver such that the energy beam of the interface apparatus is substantially adjacent the detection portion of the energy beam receiver.

43. The optical adapter assembly according to claim 42, wherein said energy source includes an elongated light strip adapted to selectively transmit the one or more controlling energy beams longitudinally therealong and strategically onto selected positions of the detection portion for detection thereof.

44. The optical adapter assembly according to claim 43, wherein said light strip includes a plurality of illumination devices aligned in an array longitudinally along said optical interface apparatus.

45. The optical adapter assembly according to claim 44, further including:

control circuitry coupled to the array of illumination devices for selective control thereof.

46. The optical adapter assembly according to claim 42, wherein said mounting device includes one or more mounting strap devices.

47. The optical adapter assembly according to claim 42, wherein said optical interface apparatus is adapted to pulse the one or more controlling energy beams.

48. The optical adapter assembly according to claim 42, wherein said optical interface apparatus is adapted to adjust the pulse rate of the one or more controlling energy beams to simulate a strobe of a rotating laser beacon.

49. The optical adapter assembly according to claim 48, wherein said pulse rate is in the range of about 5 Hz to about 15 Hz.

50. The optical adapter assembly according to claim 49, wherein said pulse rate is in the range of about 10 Hz with an ON duty cycle of about 5%.

51. The optical adapter assembly according to claim 42, wherein said energy source includes a plurality of pulsed light emitters aligned in an array longitudinally along said optical interface apparatus to strategically pulse the one or more controlling energy beams onto selected longitudinal positions of the detection portion for detection thereof.

52. The optical adapter assembly according to claim 51, wherein said energy source includes two vertically oriented pulsed light emitters.

53. The optical adapter assembly according to claim 51, wherein said energy source includes three vertically oriented pulsed light emitters positioned in linear alignment.

54. The optical adapter assembly according to claim 51, wherein said energy source includes:

one or more central pulsed light emitters corresponding to an "on-grade" correction portion of the receiver detection portion, one or more upper pulsed light emitters positioned vertically above the central pulsed light emitters which correspond to a "raise" implement correction portion of the receiver detection portion, and one or more lower pulsed light emitters positioned vertically below the central pulsed light emitters which correspond to a "lower" implement correction portion of the receiver detection portion.

55. The optical adapter assembly according to claim 54, wherein said upper pulsed light emitters include:

one or more "fine grade" upper emitters positioned vertically above the central pulsed light emitters which correspond to a "fine raise" implement correction portion of the receiver detection portion, and one or more "coarse grade" upper emitters positioned further vertically above the "fine grade" upper emitters which correspond to a "coarse raise" implement correction portion of the receiver detection portion; and said lower pulsed light emitters include:

one or more "fine grade" lower emitters positioned vertically below the central pulsed light emitters which correspond to a "fine lower" implement correction portion of the receiver detection portion, and one or more "coarse grade" lower emitters positioned further vertically below the "fine grade" lower emitters which correspond to a "coarse raise" implement correction portion of the receiver detection portion.

56. The optical adapter assembly according to claim 55, wherein said "coarse grade" upper emitters are vertically spaced apart from said "fine grade" upper emitters by a distance greater than the "fine grade" upper emitters are vertically spaced apart from the central pulsed light emitters, and said "coarse grade" lower emitters are vertically spaced apart from said "fine grade" lower emitters by a distance greater than the "fine grade" lower emitters are vertically spaced apart from the central pulsed light emitters.

57. The optical adapter assembly according to claim 42, further including:

at adapter control device coupled to said energy source and adapted to control the impingement of the one or more energy beams strategically onto selected positions of the receiver detection portion to control the elevation of the grading implement.

58. The optical adapter assembly according to claim 57, further including:

a grading data base adapted to define the desired elevation of the grading implement as a function of a measured position of the earth-moving vehicle; and said adapter control device includes a processing device operably coupled to the data base to determine an elevation error of the grading implement according to the difference between the measured and desired elevations thereof, said adapter interface control device being responsive to the elevation error to automatically adjust the operation of the one or more energy beams and control the elevation of the grading implement to reduce the elevation error.

59. A universal optical adapter assembly for use with a planar automatic grading system for an earth-moving vehicle having a grading implement tat defines a graded surface, said automatic grading system including an energy beam receiver mounted on the earth-moving vehicle and operable for detecting the height at which a datum energy beam strikes said receiver along a detection portion thereof, and a control device operably coupled to said energy beam receiver and the grading implement to control the elevation of the grading implement in response to the position at which the datum energy beam strikes said detection portion of said energy beam receiver, said optical interface adapter assembly comprising:

an optical interface apparatus adapted to cooperate with the energy beam receiver, and having at least three vertically oriented illumination devices positioned and aligned substantially linearly in an array longitudinally along said optical interface apparatus, the array of illumination devices being configured to emit one or more implement controlling energy beams strategically onto selected positions of the detection portion of the energy beam receiver to control the elevation of the grading implement.

60. The optical adapter assembly according to claim 59, wherein said optical interface apparatus includes a housing containing the array of illumination devices longitudinally along a face portion thereof.

61. The optical adapter assembly according to claim 59, further including:

a mounting device configured to mount the interface apparatus substantially adjacent to the detection portion of the energy beam receiver.

62. The optical adapter assembly according to claim 59, wherein said optical interface apparatus is adapted to pulse the one or more controlling energy beams.

63. The optical adapter assembly according to claim 59 wherein said optical interface apparatus is adapted to adjust the pulse rate of the one or more controlling energy beams to simulate a strobe of a rotating laser beacon.

64. The optical adapter assembly according to claim 63, wherein said pulse rate is in the range of about 5 Hz to about 15 Hz.

65. The optical adapter assembly according to claim 64, wherein said pulse raw is in the range of about 10 Hz with an ON duty cycle of about 5%.

66. The optical adapter assembly according to claim 59, wherein said energy source includes pulsed light emitters.

67. The optical adapter assembly according to claim 66, wherein said optical interface apparatus is adapted to adjust the pulse rate of the one or more controlling energy beams to simulate a strobe of a rotating laser beacon.

68. The optical adapter assembly according to claim 59, further including:

an adapter control device coupled to said energy source and adapted to control the impingement of the one or more energy beams strategically onto selected positions of the receiver detection portion to control the elevation of the grading implement.

69. The optical adapter assembly according to claim 68, further including:

a grading data base adapted to define the desired elevation of the grading implement as a function of a measured position of the earth-moving vehicle; and said adapter control device includes a processing device operably coupled to the data base to determine an elevation error of the grading implement according to the difference between the measured and desired elevations thereof, said adapter interface control device being responsive to the elevation error to automatically adjust the operation of the one or more energy beams and control the elevation of the grading implement to reduce the elevation error.

* * * * *